June 24, 1941.　　　A. E. DAVIES　　　2,246,509

CONNECTING DEVICE

Filed Sept. 6, 1938

INVENTOR

Albert Edward Davies

Patented June 24, 1941

2,246,509

UNITED STATES PATENT OFFICE 2,246,509

CONNECTING DEVICE

Albert Edward Davies, New Westminster, British Columbia, Canada

Application September 6, 1938, Serial No. 228,642

5 Claims. (Cl. 20—92)

This invention relates to an improved connecting device for joining two or more members together regardless of the shape, size, material or purpose of said members.

An object of the present invention is the provision of a connecting device which may be used in any type of construction or manufacture where it is required to join two or more members or articles together.

Another object is the provision of a connecting device by means of which two or more members or articles may be joined together without the necessity of using rivets, bolts, screws, nails, glue or other connecting means.

A further object is the provision of a connecting device which may be formed of any suitable material, such as metal, wood or a composition, depending upon the purpose for which it is intended.

A still further object is the provision of a connecting device by means of which the time necessary for joining together two or more members or articles is greatly reduced.

At the present time, when it is desired to join two or more members together, those members must first be brought together and then connected to each other by means of rivets, bolts, screws, nails, glue or other suitable connecting means. The present invention reduces this operation so that it is only necessary to bring the members together, the union thereof being substantially automatic.

In the present invention, each of the members to be joined together is formed with or has secured thereto by suitable means, a connector so formed that when two of them are brought together they lock together and may be disengaged by movement in one particular direction only. It is possible by using a plurality of these connectors to so connect two or more members or articles together that they cannot accidentally come apart and yet they may be joined together and taken apart quite easily in the proper manner.

The chief aim of this invention is to make possible the mass production of members or units to be used in construction or manufacture and to reduce the time and effort necessary in assembling or disconnecting these members or units. The members to be used in the manufacture or construction may be made by mass production with the connectors formed thereon in the required positions or the connectors may be made separately by mass production and secured to the members in their proper positions by welding or by any other suitable means so that the members are ready for assembly at any time.

The connectors are used in pairs at each joint. However, the connectors of each pair are similar in construction but the position of one is reversed with regard to the position of the other. In view of this fact, the connectors may be manufactured in strips of indefinite length and then the connectors may be cut from these strips, the length of each connector being such as to suit the purpose for which it is intended.

Each connector of the connecting device comprises a base portion, which base portion may form part of the member to be joined to another member or it may be secured to the member in any suitable manner, a plurality of projections disposed from the base portion, said projections preferably being disposed angularly with regard to said base portion, at least one recess formed between the projections and a shoulder extending outwardly from the base along one side of the projections.

As stated above, in each pair of connectors the position of one connector is reversed in relation to the other. When the connectors are in this position, the projections of one may be fitted into the recesses of the other, at which time the shoulders of the connectors abut against each other. This is done simply by moving one connector towards the other in the proper direction. The connectors are now locked together and may be disengaged only by moving one of the connectors away from the other in the exact opposite direction to the direction of movement in bringing them together. This movement of the connectors is in a direction lying at an angle to the bases thereof. When the connectors are together, the sides of the projections of one engage the sides of the projections of the other to prevent the disengagement of the connectors by any force except when applied in the proper direction, the shoulders which extend outwardly from the base, preventing any lateral movement of said connectors.

The accompanying drawing shows the principle of this invention and certain ways in which it may be used but it is to be understood that they are illustrative only and are not to be taken in a limiting sense:

Figure 1:
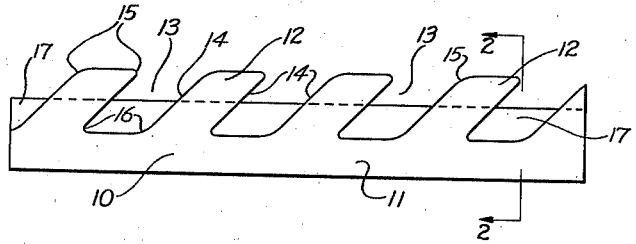
Figure 1 is an elevation of a connector by itself.
Figure 2:
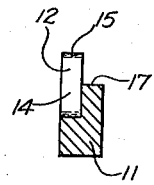
Figure 2 is a sectional view taken on the line 2—2 of Figure 1.

Referring to Fig. 1, 10 is a connector having a base portion 11 and a plurality of projections 12 extending outwardly from the base portion, said projections preferably being inclined or disposed at an angle to the base portion. However, this is not absolutely necessary since the projections may extend straight out from the base or the inclination or angularity thereof may be increased or decreased from that shown in the drawing. The projections may be formed with the base portion or they may be made separately and secured thereto in any suitable manner, such as by welding. The projections 12 are preferably disposed at equal and regular intervals from the base portion to form recesses 13 therebetween, which recesses are either straight or angularly disposed with regard to the base portion depending upon the setting of the projections 12. As stated above, the projections are preferably disposed at equal and regular intervals from the base portion but, if desired, they may be disposed at irregular intervals. The recesses 13 are regular or irregular depending upon the position of the projections 12.

The sides 14 of each projection 12 are preferably parallel to each other and parallel to the adjacent sides of the adjacent projections. It will be noted that the projection at the right hand end of Fig. 1 is incomplete but this is not necessary so that, if desired, this projection may be complete, the same as the rest of them. Here again, the sides 14 of the projections need not necessarily be parallel but they may converge or they may be curved or irregularly shaped although it is considered that the best results for most purposes are obtained with the parallel sides. In the preferred form of the invention, the tops of the projections 12 are parallel to the bottoms of the recesses 13 but, in any case, the tops of the projections should be the same shape as the bottoms of the recesses. The side edges of the outer ends of the projections are preferably bevelled or rounded, as at 15, and the junction of the bottom of each recess and the sides of each projection are correspondingly bevelled or rounded, as at 16. A shoulder 17 extends outwardly from the base portion 11 along one side of the projections 12 and terminates substantially midway between the outer and inner ends of said projections. This shoulder may be formed with the base portion, as shown, or it may be secured thereto in any suitable manner, such as by welding. The connectors 10 may be formed without the shoulder 17 for certain purposes but it is preferable to include the shoulder.

From the foregoing, it will be seen that the preferred form of connector 10 comprises a base portion 11, a plurality of projections 12 angularly disposed at equal and regular intervals from the base portion, angularly disposed recesses 13 formed between said projections and a shoulder 17 extending outwardly from the base portion along one side of the projections. In actual practice, the base portion 11 may be secured to the member with which the connector is being used or it may form part of the member itself.

Figure 3:
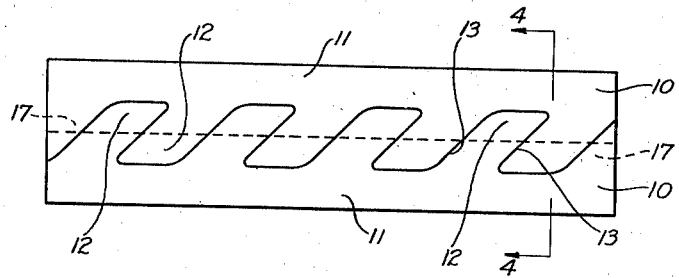
Figure 3 is an elevation of two connectors engaged to form a connecting device.
Figure 4:
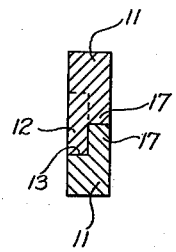
Figure 4 is a section taken on the line 4—4 of Figure 3.

Figures 3 and 4 illustrate two of the connectors 10 in engagement. The upper connector is exactly the same as the lower one. It is not always necessary, however, to have the same number of projections 12 and recesses 13 in each of the co-operating connectors. The position of the one connector is reversed in relation to that of the other connector so that the projections of one fit snugly within the recesses of the other, the projections being the same width and depth as the recesses, and the shoulders 17 abut against each other. The bevel or rounded surfaces 15 make the free ends of the projections narrower and the entrances to the recesses 13 wider so that there is no difficulty in starting the projections into the recesses, which difficulty might exist when the connectors are hidden by the members to be joined together. The bevel or rounded surfaces 16 at the junction of the bottoms of the recesses and the sides of the projections serves to ensure a snug fit between said projections and recesses. The projections of the upper connector, in Fig. 3, are moved into the recesses of the lower connector by moving the former to the left and towards the latter. These connectors may be disengaged by movement in only one direction, that is, by moving the upper connector to the right and away from the lower connector. This movement is in the exact opposite direction to the movement necessary in engaging the connectors. The shoulders 17 of the connectors prevent lateral displacement thereof since they overlap the projections of both connectors.

Figure 5:
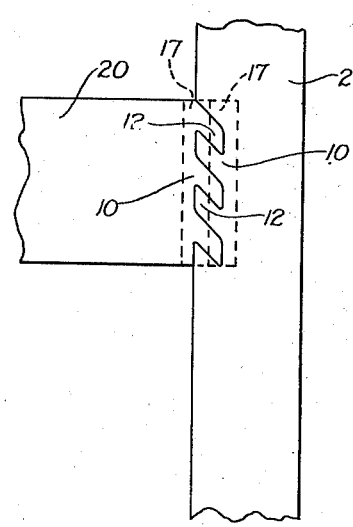
Figure 5 is an elevation of two members joined together by one form of the connecting device.

Figure 5 illustrates the connectors as being formed with members 20 and 21 which are required to be joined together. The member 20 is formed with a plurality of projections 12 and recesses 13 and the member 21 is formed with corresponding projections and recesses the angularity of which is reversed in relation to that of the projections and recesses of the member 20. In this case, where the member 20 is in a horizontal position and the member 21 is in a vertical position, the projections and recesses of the former are inclined downwardly while the projections and recesses of the latter are inclined upwardly. The members 20 and 21 form the base portion for the connectors and a shoulder 17 is secured to each of said members along one side of the projections in such a manner that they abut together when the projections fit snugly within the recesses.

Figure 6:
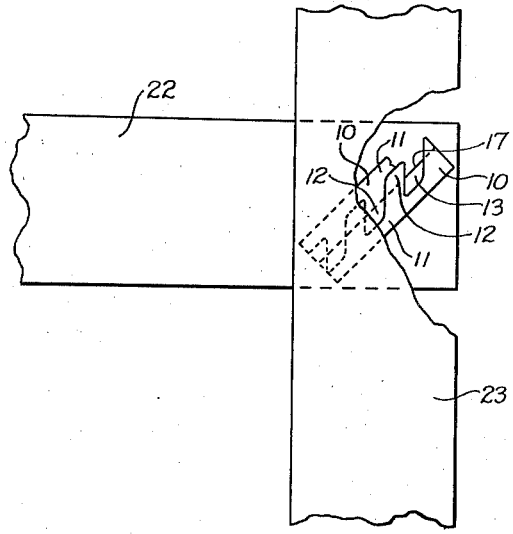
Figure 6 is an elevation of two members joined together by another form of the connecting device, certain parts being broken away for clarity.

Figure 6 illustrates a horizontal member 22 joined to a vertical member 23 by means of the connecting device. In this construction, the upper connector 10 is secured to the horizontal member 22 at an angle of approximately 45° and the lower connector 10 is secured to the vertical member 23 at the same angle. The shoulders are shown as being next to the member 22 but they might equally well be placed next to the member 23. When used in this manner, the connecting device is completely covered by the members that are joined together. The connectors may be disengaged only by moving the upper connector in an upwardly direction.

The possibilities of this connecting device are too numerous to mention but it will be seen that it may be used where ever it is necessary to join two or more members or articles together. The connectors may be manufactured in strips and each connector of the required length may be cut therefrom and secured to the member in the desired position by suitable means, such as by welding, or the connectors may be formed with the members in their desired positions.

From the above, it will readily be seen that a connecting device has been produced that may be used in any type of construction or manufacture where it is required to join two or more members or articles together and which may be employed without the necessity of using rivets, bolts, screws, nails, glue or other connecting means.

Various modifications may be made in this invention without departing from the spirit thereof or the scope of the claims, and therefore the exact forms shown are to be taken as illustrative only and not in a limiting sense, and it is desired that only such limitations shall be placed thereon as are set forth in the accompanying claims.

What I claim as my invention is:

1. A connecting device comprising, in combination, a connector formed with or secured to a member to be joined to another member, said connector having a base portion, a plurality of projections angularly disposed at suitable intervals from the base portion and a shoulder extending outwardly from the base portion along one side of the projections, and another connector formed with or secured to the other member, said last-mentioned connector having a base portion, a plurality of projections angularly disposed from the base portion at one side of its member and a shoulder extending outwardly from the base portion along the side of the projections remote from its member, the angularity of the projections of said connectors being arranged so that the projections of one fit between the projections and between the member and the shoulder of the other until the shoulders abut rigidly to connect the members together.

2. A connecting device comprising, in combination, a connector formed with or secured to a member to be joined to another member, said connector having a base portion, a plurality of projections angularly disposed from the base portion, and a shoulder extending outwardly from the base portion along one side of the projections, said shoulder terminating short of the projection ends, and a similar connector formed with or secured to the other member, the teeth of the latter connector being on the opposite side of its shoulder in relation to its member to that of the first-mentioned connector and said latter connector being reversed in relation to the former connector whereby the projections of the connectors removably fit between each other rigidly to connect the members together.

3. A connecting device comprising, in combination, a connector formed with or secured to a member to be joined to another member, said connector having a base portion, a plurality of projections angularly disposed at suitable intervals from the base portion, and a shoulder extending outwardly from the base portion along one side of the projections between said projections and the member, and another connector formed with or secured to the other member, said last-mentioned connector having a base portion, a plurality of projections angularly disposed from the base portion at one side of the member and a shoulder extending outwardly from the base portion along the side of the projections remote from its member, the angularity of the projections of said connectors being arranged so that the projections of one fit between the projections and between the member and the shoulder of the other until the shoulders abut rigidly to connect the members together.

4. A connecting device comprising, in combination, a connector formed with or secured to a member to be joined to another member, said connector having a base portion, a plurality of projections angularly disposed at intervals from the base portion and a shoulder extending outwardly from the base portion along one side of the projections, said shoulder terminating short of the projection ends, and another connector formed with or connected to the other member, said last-mentioned connector having a base portion, at least one projection angularly disposed from the base portion at one side of its member and a shoulder extending outwardly from the base portion along the side of the projection remote from its member and terminating short of the projection end, the angularity of the projections of said connectors being arranged so that they fit between each other until the shoulders abut rigidly to connect the members together.

5. A connecting device comprising, in combination, a connector formed with or secured to a member to be joined to another member, said connector having a base portion, at least one projection angularly disposed from the base portion and a shoulder extending outwardly from the base portion along one side of the projection, said shoulder terminating short of the projection end, and another connector formed with or connected to the other member, said last-mentioned member having a base portion, a plurality of projections angularly disposed at intervals from the base portion at one side of its member and a shoulder extending outwardly from the base portion along the side of the projections remote from its member and terminating short of the projection ends, the angularity of the projections of said connectors being arranged so that they fit between each other until the shoulders abut rigidly to connect the members together.

ALBERT EDWARD DAVIES.